UNITED STATES PATENT OFFICE.

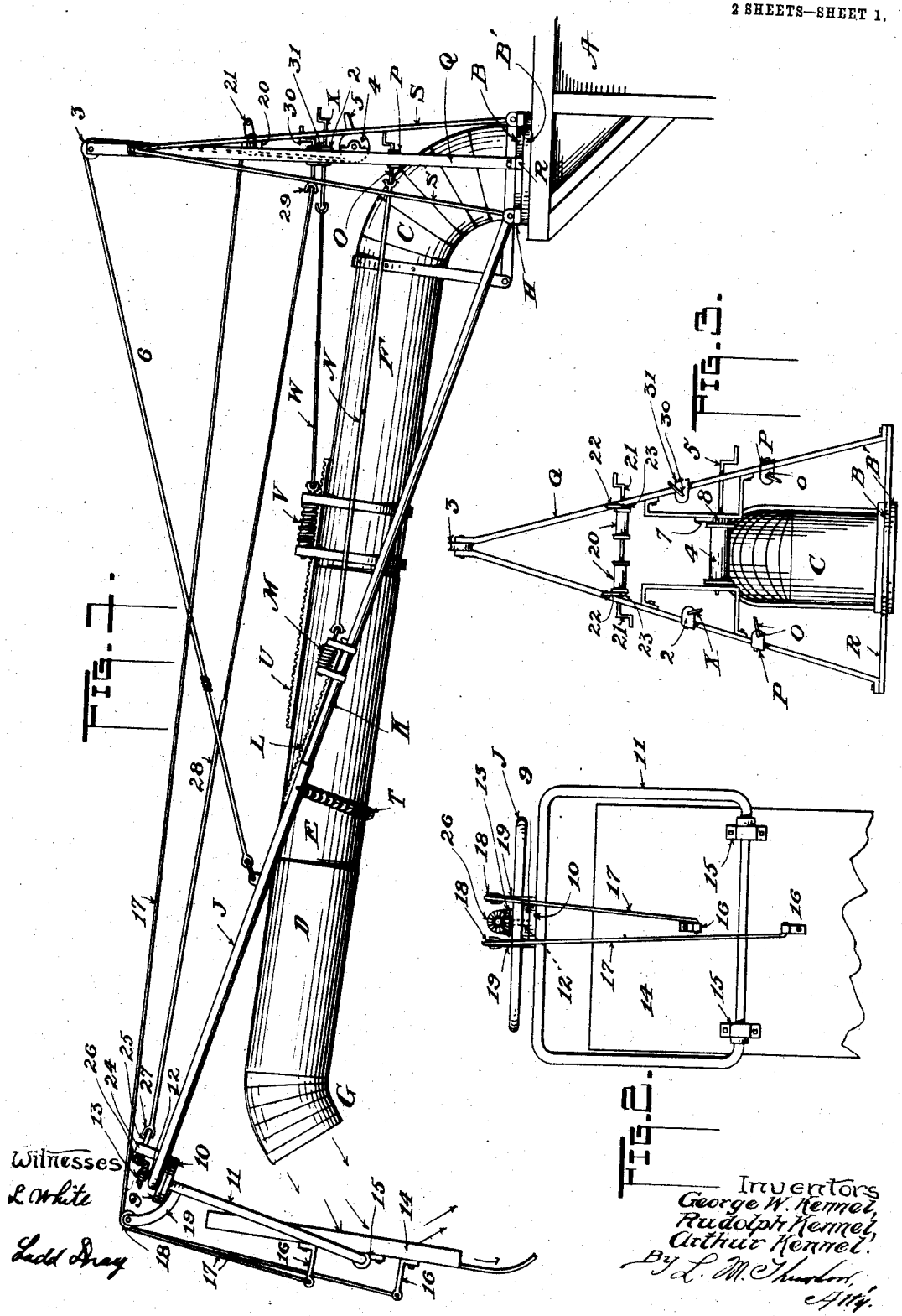

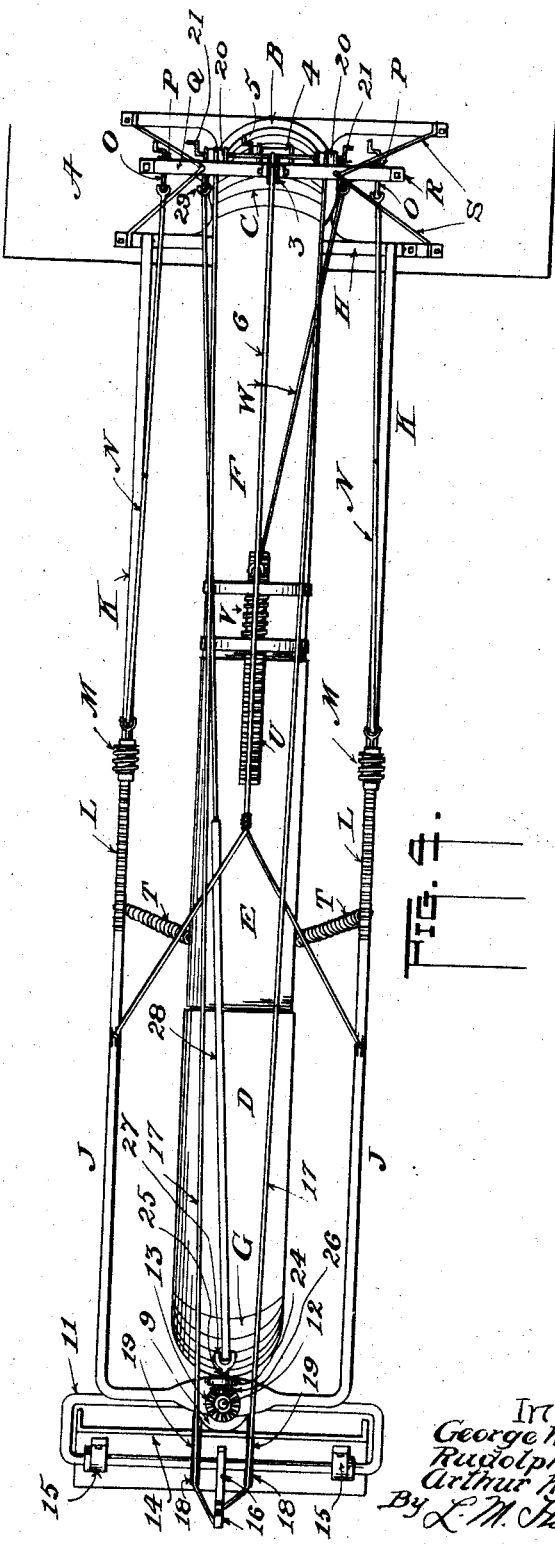

GEORGE W. KENNEL, RUDOLPH KENNEL, AND ARTHUR KENNEL, OF WASHINGTON, ILLINOIS.

ATTACHMENT FOR WIND-STACKERS.

No. 893,804.  Specification of Letters Patent.  Patented July 21, 1908.

Application filed November 15, 1907. Serial No. 402,351.

*To all whom it may concern:*

Be it known that we, GEORGE W. KENNEL, RUDOLPH KENNEL, and ARTHUR KENNEL, citizens of the United States, residing at Washington, in the county of Tazewell and State of Illinois, have invented certain new and useful Improvements in Attachments for Wind-Stackers; and we do hereby declare that the following is a full, clear, and exact description of the invention, which will enable others skilled in the art to which it appertains to make and use the same.

This invention relates to a blower attachment and deflector for wind stackers.

The object of the invention, primarily, is to provide a deflector at the discharge end of the discharge-pipe in a wind stacker, that can be adjusted in all directions thereby giving what may be termed a "universal" adjustment.

Other objects and advantages will appear as the description of the invention proceeds.

In the accompanying drawings, Figure 1 is a side elevation of a portion of a wind stacker and a discharge pipe for the same, showing our deflector in connection therewith and means for adjusting said discharge pipe and deflector. Fig. 2 is a rear view of the deflector and the means for adjusting it. Fig. 3 is a front view of a derrick, or mast, on which the means for adjusting the discharge pipe and deflector are secured. Fig. 4 is a top view of the device as illustrated in Fig. 1.

In forming a stack with a wind stacker considerable trouble is experienced in so directing the discharge that the straw will not be blown over and beyond the back of the stack. For this reason the stack cannot always be properly made or kept in a compact form and our experience has shown that by placing a deflector, such for instance, as a sheet of metal or a board or some like member behind the discharge end of the discharge pipe and providing means for its universal adjustment, as will be hereinafter described, we are enabled to build a stack of symmetrical form and one that is compact thus completely overcoming the trouble mentioned.

In the figures, A indicates the machine on which the usual discharge pipe for the straw is ordinarily mounted and upon which it is adapted for movement in a horizontal direction through suitable bearing plates which in the present instance are indicated by B and B' and which are secured together but permitted to turn one upon the other, after the manner of a "fifth wheel", all of which will be understood. This pipe, indicated by D, E, F, is jointed at C so that it can be moved vertically as well as telescope upon itself and its outer end may likewise have a shiftable or adjustable head G to direct the wind in any direction. Upon a horizontal arm H, forming part of the plate B, is pivoted a telescoping frame J K the portion J thereof being of tubular form and slidable upon K the latter telescoping it and on each extremity of said portion J is secured a cogged rack L, while journaled in any good manner upon the part K is a worm M to engage said rack. The said rack, as just stated, is, at one end, secured to the portion J while its other end is slidable upon the member K extending through openings in the members secured to member K which support the worm M, such openings, however, not having been shown. It is evident that by imparting movement to the worm the rack will be moved in the direction of its length along the member K and shifting with it the portion J. A telescoping rod or shaft N having a knuckle joint at each end is connected to the shaft of the worm, the other end having connection with a cranked shaft O having its bearings in a bracket P on a mast Q erected upon horizontal extensions R of the said upper plate B, there being suitable braces therefor at S as shown in Figs. 1 and 4.

By the means described it will be seen that the telescoping frame J K may be readily adjusted in length and the pipe D, E, F, may be suitably hung from the frame just described as, for instance, by means of a spring T forming a stirrup the ends of which are connected to the frame, but other means may be employed to serve the same purpose. Similar mechanism to that already described is used on the pipe between the parts E F, that is to say, a rack U is secured on the section E and a worm V secured on the section F is operated by a telescoping shaft W operated from a crank at X having bearings in a bracket 2 on the said mast Q. At the top of said mast is a grooved roller 3 and some distance below it is a winch 4 having suitable bearings in the mast and operated by a crank 5. A cable 6 winds upon the winch and passes over the grooved roller 3 and thence extends forward and has attachment with both limbs J of the frame J K, (see Fig. 1), by which means the said frame J K can be adjusted in height there being a pawl 7 and ratchet 8 for the winch whereby the frame can be supported in any position. At the outer yoked end of the frame is a plate 9 beneath which is a similar plate 10 to which is rigidly connected a depending frame 11 with which is connected a shaft 12 the upper end of which carries a beveled gear 13, said shaft extending through the upper plate 9 so that movement of the gear will impart a like movement to the said frame 11, the plates 9 and 10 merely forming bearings between the frame 11 and the frame J K. Carried on the lower portion of the frame 11 is a deflector 14 by means of bearings 15 the arrangement being such that said deflector may rock on a horizontal axis. Both above and below said axis is an arm 16 secured to the deflector which projects at right angles thereto, and to each of said arms is connected a cable 17 extending upward over grooved rollers 18, on arms 19 attached to the frame 11 so as to move therewith, the cables extending toward the mast Q to wind upon winches 20 separately and independently operated by means of suitable cranks 21, there being pawls 22 and ratchet wheels 23 at the winches for holding the deflector in any adjustment. It will be noted that by turning the winches in opposite directions one of the cables will be shortened and the other permitted to lengthen whereby the deflector will be swung on its axis on the frame 11 to obtain any desired angle.

Mounted upon the portion J of the frame J K is an upright 24 constituting a bearing for a shaft 25 provided with a beveled gear 26 to mesh with the beveled gear 13 before described. Connected by means of a knuckle joint at 27 is a telescoping shaft 28 the opposite end also having a knuckle joint at 29 connected with a cranked shaft 30 having bearings in a bracket 31 on the mast Q. A movement of the beveled pinion 26 will impart motion to the gear 13 and thereby the frame 11 and its deflector will be swung as on a substantially vertical axis. A universal movement of the deflector is now possible and any adjustment as to length and height of the frame J K and the discharge pipe, may be had, and all these adjustments can be made at a common position on the machine, so that the operator having in mind the shape of the stack he desires to build may readily adjust the parts to that end, and by the use of the deflector can absolutely prevent the straw being blown over and behind the stack. The value of the deflector for this purpose will be readily appreciated by those familiar with the operation of wind stackers. The deflector can also swing in the arc of a circle along with the discharge pipe, so that it is always in position to effect the air blast directed thereagainst.

Having thus described our invention, we claim:

1. In a wind stacker, the combination of a discharge pipe, a support, a deflector positioned opposite the discharge end of the pipe, a frame suspended vertically from the support on a substantially vertical pivot and having the said deflector mounted thereon to tilt on a substantially horizontal axis, means for tilting the said deflector on its horizontal axis, and other means for moving the frame on its pivot relative to said support.

2. In a wind stacker, the combination of a discharge pipe, a support, a frame carried on a vertical axis on the latter, a deflector positioned opposite the discharge end of said pipe and pivoted horizontally on said frame, means attached to the deflector for tilting it upon its horizontal axis, and means for swinging the frame on its said vertical axis.

3. In a wind stacker, the combination of a discharge pipe, a support suspended from the stacker, a frame suspended from the support and adapted to swing on a substantially vertical axis, a deflector mounted on the frame opposite the discharge end of the pipe and adapted to tilt on a substantially horizontal axis thereon, means attached to the deflector for tilting it upon the frame, and other means for swinging the frame on its said vertical axis.

4. In a wind stacker, the combination of a discharge pipe, a support suspended from the stacker, a frame suspended therefrom to swing on a substantially vertical axis, a deflector suspended on the frame to tilt on a substantially horizontal axis, means attached to the deflector to tilt it, such means extending rearward and operated from the stacker, and operating means on the stacker, having operative connection with the frame for swinging it on its axis.

5. In a wind stacker, its discharge pipe, a deflector positioned opposite the discharge end of said pipe, means by which upon a substantially vertical and a substantially horizontal axis, the deflector is carried for adjustment, means on the machine for adjusting the deflector at any angle relative to the pipe, means for imparting a vertical movement to the deflector and the discharge pipe, and means also for separately adjusting the deflector and the pipe to vary the distance between them.

6. In a wind stacker, the combination of a discharge pipe for conveying the straw and adapted for vertical adjustment and capable of adjustment for length, a deflector positioned opposite the discharge end of said pipe and adapted for vertical adjustment and capable also of adjustment at any angle relative to the pipe, means for adjusting the pipe, means for adjusting the deflector, and other means for varying the distance between the pipe and the deflector, all such means being operative from a common position at the machine 7. In a wind stacker, the combination of a discharge pipe, a support suspended from the stacker, a frame suspended therefrom and adapted to swing on a substantially vertical axis, a deflector suspended from the frame and adapted to tilt on a substantially horizontal axis, means attached to the deflector at each side of its axis for tilting it, a gear wheel carried by the frame, and a telescoping member extending rearward to the stacker and having a gear wheel on its forward end to engage that of the frame substantially as described.

8. In a wind stacker, the combination of a telescoping discharge pipe, a telescoping support suspended from the stacker, a frame suspended from the latter, the said discharge pipe being also suspended from the support, a deflector suspended from the frame, means for tilting the deflector, means for swinging the frame relative to the support, means for telescoping the frame, and other means for telescoping the said discharge pipe.

9. In a wind stacker, the combination of a telescoping discharge pipe, a telescoping support suspended from the stacker, a frame suspended from the latter, the said discharge pipe being also suspended from the support, a deflector suspended from the frame, means for tilting the deflector, means for swinging the frame relative to the support, means for telescoping the frame, means for telescoping the said discharge pipe, and other means for imparting a vertical movement to the support.

In testimony whereof we affix our signatures, in presence of two witnesses.

GEORGE W. KENNEL.
RUDOLPH KENNEL.
ARTHUR KENNEL.

Witnesses:
L. A. HOEFLIN,
PETER GARBER.